A. STAUBACH.
TIRE SHIELD.
APPLICATION FILED APR. 7, 1922.

1,435,090.

Patented Nov. 7, 1922.

Fig.2.ª

Inventor
Alois Staubach,

By

Attorney

Patented Nov. 7, 1922.

1,435,090

UNITED STATES PATENT OFFICE.

ALOIS STAUBACH, OF CRESTLINE, OHIO.

TIRE SHIELD.

Application filed April 7, 1922. Serial No. 550,434.

*To all whom it may concern:*

Be it known that ALOIS STAUBACH, a citizen of the United States of America, residing at Crestline, in the county of Crawford and State of Ohio, has invented new and useful Improvements in Tire Shields, of which the following is a specification.

The object of the invention is to provide an effective means for protecting the tread of a tire of the pneumatic type used on motor driven vehicles and the like and for increasing the tractive effect of the tire for use particularly in wet weather or in connection with loose or sandy road surfaces, and on snow and ice, or whenever the rubber face of the tire is inadequate to afford the necessary traction; and with this object in view the invention consists in a construction and combination of parts of which a preferred embodiment is shown in the accompanying drawings, wherein:—

Figure 1:
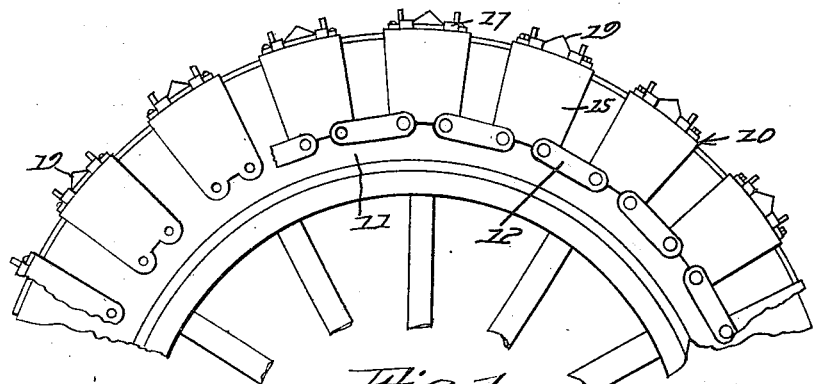
Figure 1 is a side view of a tire shield and tread embodying the invention.
Figure 2:
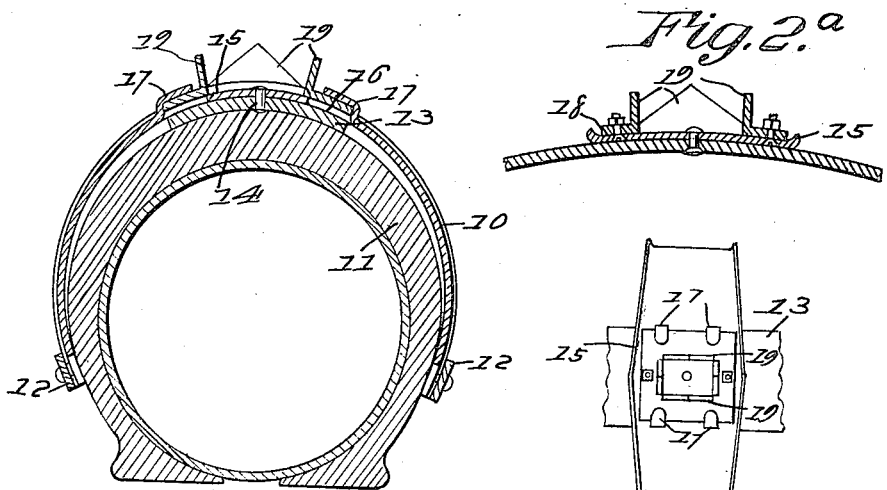
Figure 2 is a transverse sectional view of the same.

Figure 2ª is a longitudinal sectional view through one of the tread members.

Figure 3:
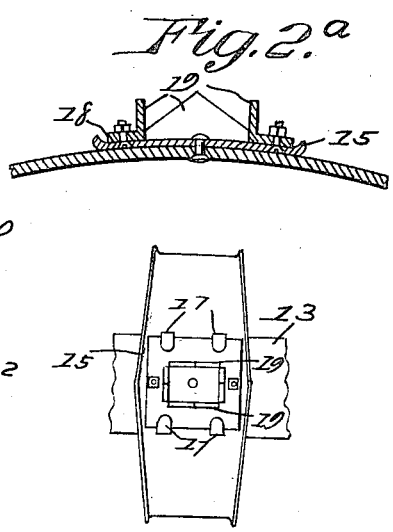

Figure 3 is a plan view of one of the tread members.

Figure 4:
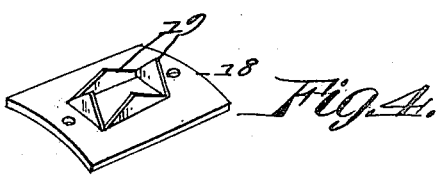

Figure 4 is a detail view in perspective of one of the spur plates.

The device consists essentially of a series of transversely disposed arched plates 10 adapted to extend more than half way around the tire 11 and connected at their extremities by links 12 which being pivotally mounted on the tread members 10 permit of the required flexibility of the device and the folding thereof when removed from the tire. These tread members are longitudinally connected in series by a tread band 13 of suitably flexible material extended beneath the tread members or between the latter and the surface of the tire and to which the tread members are secured at their centers by rivets 14 or the equivalents thereof. Carried by each tread member, which is preferably transversely channeled or concaved exteriorly by the upturning or flanging of the side edges thereof as indicated at 15, is a spurred plate or shoe 16 secured by upstruck ears or clips 17 from the tread member and bolted as indicated at 18 to the same and having upstruck spurs 19 which project radially from the tire and are suitably reduced or sharpened to obtain a firm tractive grip on the road surface.

In addition to being outwardly concaved to form the flanges 15 as above-described the tread members are preferably tapered in width from their centers toward their extremities and thereupon cooperate with the spurred plates or shoes in increasing the tractive effect of the wheels especially in sand or snow or other like material into which the tire treads are disposed to sink or settle.

Having described the invention, what is claimed as new and useful is:—

A tire shield having interconnected transversely disposed outwardly concaved tread members each of which is provided with upstruck ears disposed uniformly on opposite sides of its center, spurred plates slidably engaged beneath said up-struck ears, and bolts passing through the plates and through said tread members at intermediate points between oppositely disposed ears.

In testimony whereof he affixes his signature.

ALOIS STAUBACH.